(12) United States Patent
Kondo et al.

(10) Patent No.: US 6,424,877 B1
(45) Date of Patent: *Jul. 23, 2002

(54) REPRODUCTION APPARATUS

(75) Inventors: Takashi Kondo, Sakai; Shingo Asai, Toyokawa; Koji Sugie, Toyokawa; Shinji Mishima, Toyokawa; Koji Fujiwara, Osaka, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/054,499

(22) Filed: Apr. 3, 1998

(30) Foreign Application Priority Data

| Apr. 4, 1997 | (JP) | 9-102798 |
| Apr. 4, 1997 | (JP) | 9-102800 |
| Apr. 4, 1997 | (JP) | 9-102802 |
| Apr. 4, 1997 | (JP) | 9-102803 |

(51) Int. Cl.⁷ .......................... G06F 19/00
(52) U.S. Cl. ............ 700/117; 700/98; 700/117; 700/161; 700/163; 700/195; 700/112; 345/419; 345/420; 345/429; 345/434; 345/129; 382/153; 382/154
(58) Field of Search .............. 700/17, 98, 117, 700/118, 119, 195, 197, 112–113, 161, 163, 186; 345/591, 419, 420, 425, 428, 429, 431, 439, 129; 382/162, 153, 154, 167

(56) References Cited

U.S. PATENT DOCUMENTS

| 4,663,720 A |   | 5/1987  | Duret et al. ............... 700/195 |
| 4,758,093 A |   | 7/1988  | Stern et al. ................ 356/376 |
| 4,794,262 A |   | 12/1988 | Sato et al. .................. 250/560 |
| 4,821,200 A | * | 4/1989  | Oberg ........................ 700/118 |
| 5,088,864 A |   | 2/1992  | Yanagida .................... 409/96  |
| 5,102,223 A |   | 4/1992  | Uesugi et al. .............. 356/376 |
| 5,115,400 A | * | 5/1992  | Watanabe et al. ........... 700/182 |
| 5,216,616 A | * | 6/1993  | Masters ...................... 700/118 |
| 5,257,097 A | * | 10/1993 | Pineau et al. ............... 358/500 |
| 5,452,219 A | * | 9/1995  | Dehoff et al. ............... 700/163 |
| H1506 H     | * | 12/1995 | Beretta ....................... 345/199 |
| 5,552,992 A | * | 9/1996  | Hunter ....................... 700/118 |
| 5,631,840 A | * | 5/1997  | Ooka et al. ................. 700/195 |
| 5,724,264 A | * | 3/1998  | Rosenberg et al. ......... 700/195 |
| 5,736,201 A | * | 4/1998  | Flint .......................... 700/118 |
| 5,798,924 A | * | 8/1998  | Enfinger et al. ............ 700/118 |
| 5,841,661 A | * | 11/1998 | Buchanan et al. ............ 700/98 |
| 5,880,962 A | * | 3/1999  | Andersson et al. ........... 700/98 |
| 5,901,060 A | * | 5/1999  | Schall et al. ................ 700/98 |
| 5,926,388 A | * | 7/1999  | Kimbrough et al. ........ 700/118 |

FOREIGN PATENT DOCUMENTS

| JP | 08190416  | 7/1996 |
| JP | 8-190416  | 7/1996 |
| JP | 8-229771  | 9/1996 |

* cited by examiner

Primary Examiner—Ramesh Patel
(74) Attorney, Agent, or Firm—McDermott, Will & Emery

(57) ABSTRACT

In order to produce a reproduction of an object such as a human face, a three-dimensional form of the object is measured with a three-dimensional measuring device, and the measured form is displayed. After a user approves the displayed form, a material is worked according to the measured form to work a reproduction of the object. If the user cancels the displayed form, the form is measured again and the measured form is displayed. Characteristics of the measured form are extracted, and an appropriate material is selected among a plurality of materials. On the other hand, the data of the measured form are converted to work data with reference to the size and the quality of a product to be worked which have been stored in a database. Preferably, the data are compressed in the depth direction in order to shorten the working time. Then, the material is worked in a series of processes from the form input to the working in a simple way, and the user can obtained a desired three-dimensional reproduction.

16 Claims, 16 Drawing Sheets

REPRODUCTION APPARATUS

This application is based on applications Ser. Nos. 9-102798, 9-102800, 9-102802 and 9-102803/1997 filed in Japan, the content of which is incorporated hereinto by reference.

BACKGROUND OF THE INVENTION

1. Field of the Invention

The present invention relates to an apparatus which produces a three-dimensional reproduction.

2. Description of Prior Art

A measuring device is known to measure a three-dimensional form of a three-dimensional object. An apparatus is also known that works a material based on three-dimensional form data to provide a three-dimensional reproduction. In a prior art apparatus which measures and reproduces a three-dimensional object, a working machine generates work data used for working based on three-dimensional form data. Then, it works a material according to the form data to generate a three-dimensional reproduction.

In the apparatus which measures and reproduces three-dimensional object, however, the reproduction happens to be different from that supposed by a user. This is caused, for example, by inappropriate measuring direction for the three-dimensional object to be measured, or errors generated in data conversion of the measurement data. In such a case, the user has to repeat working, and this wastes the time and the material needed for the previous working.

In the prior art apparatus, the material is worked from a predetermined pattern. If the size of the material is largely different from that of the form data, roughing is performed first in order to provide the material to have about the same size as the form data. In this case, it takes a long time for forming a three-dimensional reproduction.

In the working of a three-dimensional model, when data on working are generated based on the three-dimensional form data, specifications are required on the form of the produced object or the three-dimensional model (size and the like) and on the quality (such as density and smoothness of point data or plane data which construct the three-dimensional model.) Therefore, it is needed to edit the three-dimensional data in correspondence to the specifications on the form and the quality.

When a material is worked mechanically with cutting or the like based on the three-dimensional form data, if unevenness in the depth direction is large, it takes a long time on working. Especially for an apparatus which measures a three-dimensional object and reproduces it subsequently, the immediate reproduction is important in order to provide the reproduction to the user readily. Therefore, it is desirable that the working time is short. As to an apparatus which synthesizes the three-dimensional object with a background thereof, it is a problem that it takes a long time on working because the background has a large depth.

SUMMARY OF THE INVENTION

A first object of the present invention is to provide an apparatus which produces a three-dimensional reproduction efficiently.

A second object of the present invention is to provide an apparatus which performs a series of processes from form input data to working simply.

A third object of the present invention is to provide an apparatus which forms a reproduction in a short time.

In one aspect of the invention, a reproduction apparatus comprises a working apparatus which works a material based on three-dimensional form data of an object to produce a reproduction thereof. The three-dimensional form data are generated by a measuring device, and a display device displays a form of the object based on the form data. After a user operates the input device for approval, the working apparatus start to produce the reproduction.

In a second aspect of the invention, a three-dimensional forming apparatus comprises a material supplier which stores materials of a plurality of patterns to be used as a material for forming a reproduction of an object based on three-dimensional form data. Characteristics of the form data are extracted, and an appropriate pattern is selected in the patterns based on the characteristics. Then, a working apparatus works a material of the selected pattern.

In a third aspect of the invention, a three-dimensional forming apparatus produces a reproduction of an object in a series of processes automatically. A three-dimensional form of the object is measured to provide three-dimensional data, a data converter converts the three-dimensional data to form data according to characteristics of a working apparatus stored in a storage device, a data generator generates work data according to the converted form data and the stored characteristics, and a working apparatus which works a three-dimensional model of the object based on work data.

In a fourth aspect of the invention, a three-dimensional forming apparatus comprises a working apparatus which works a three-dimensional model based on three-dimensional data of an object to reproduce the object. A three-dimensional measuring device generates three-dimensional data of the object, and a compression device compresses the data in a predetermined direction. Thus, a reproduction compressed in the predetermined direction is produced.

In a fifth aspect of the invention, a three-dimensional forming apparatus for producing a reproduction of an object comprises a detector which detects a background portion of three-dimensional data measured by a measuring device, and a data converter converts the three-dimensional data at the background portion to predetermined form data. Then, a working apparatus works a three-dimensional model by working a material according to the three-dimensional data synthesized with the data for the background portion.

An advantage of the present invention is that a three-dimensional reproduction satisfied by a user can be provided.

Another advantage of the present invention is that a three-dimensional reproduction can be worked without wasting material and time.

A further advantage of the present invention is that a three-dimensional reproduction can be worked in a short time.

A still further advantage of the present invention is that a three-dimensional reproduction can be worked stably according to predetermined specifications.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
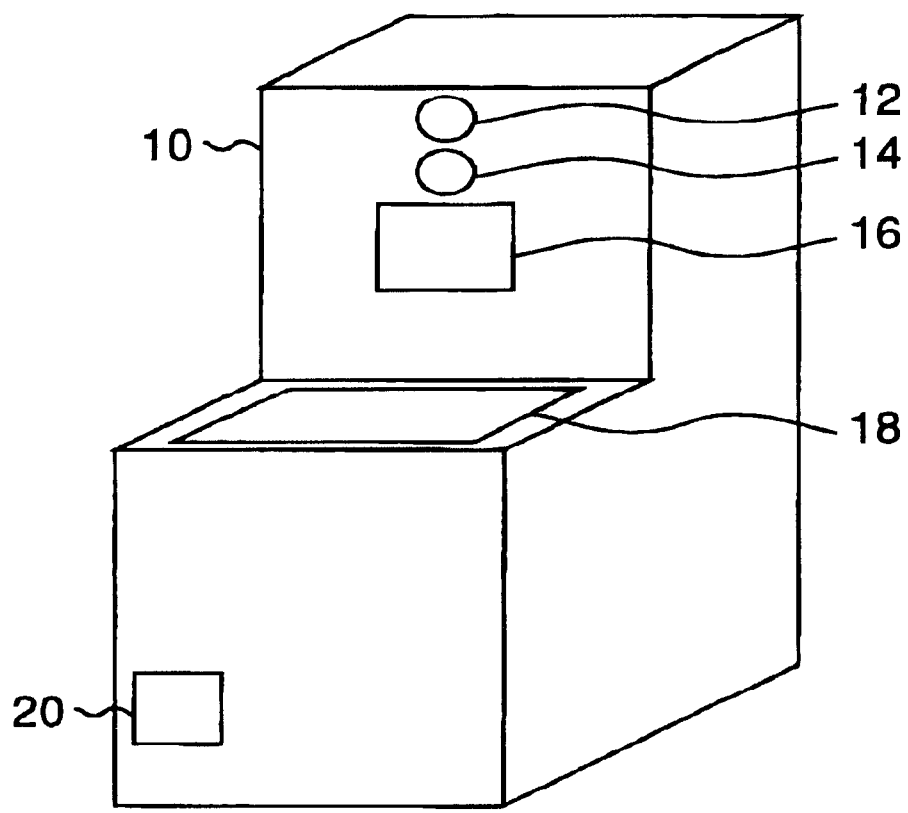
FIG. 1 is a perspective view of an apparatus which produces a three-dimensional reproduction.

Referring now to the drawings, wherein like reference characters designate like or corresponding parts throughout the views, a reproduction apparatus according to an embodiment of the invention is explained. FIG. 1 is a perspective view of an apparatus which produces a three-dimensional reproduction. This apparatus reproduces a three-dimensional face of a person (user) who stands before it immediately. The three-dimensional reproduction may have various types, and an example is a reproduction having a face of the head extruding from a square plate. A background may be synthesized into the reproduction. The apparatus can form and provide the reproduction immediately while the user stands before it.

The apparatus has a light projection window 12 and a light receive window 14 at the front of a casing 10 thereof. While a user stands before the casing 10, a light projected from the light projection window 12 is reflected by the user's face and is received by the light receive window 14. Thus, three-dimensional data of the face is measured. When the pose of the user or the composition is determined, the user's face is measured in three dimensions, and the obtained three-dimensional image is displayed in the display device 16. If the user is not satisfied by the composition, a new and different composition is taken, and the measurement and the display of the face are repeated. If the user instructs approval of the three-dimensional image displayed by the display device 16 with the operation panel 18, a working machine provided in the casing 10 forms a three-dimensional product. The user takes it out from an output 20. In this embodiment, a three-dimensional image is measured with light-section method, but it may be obtained with structured light projection method, stereo method or moire method.

Figure 2:
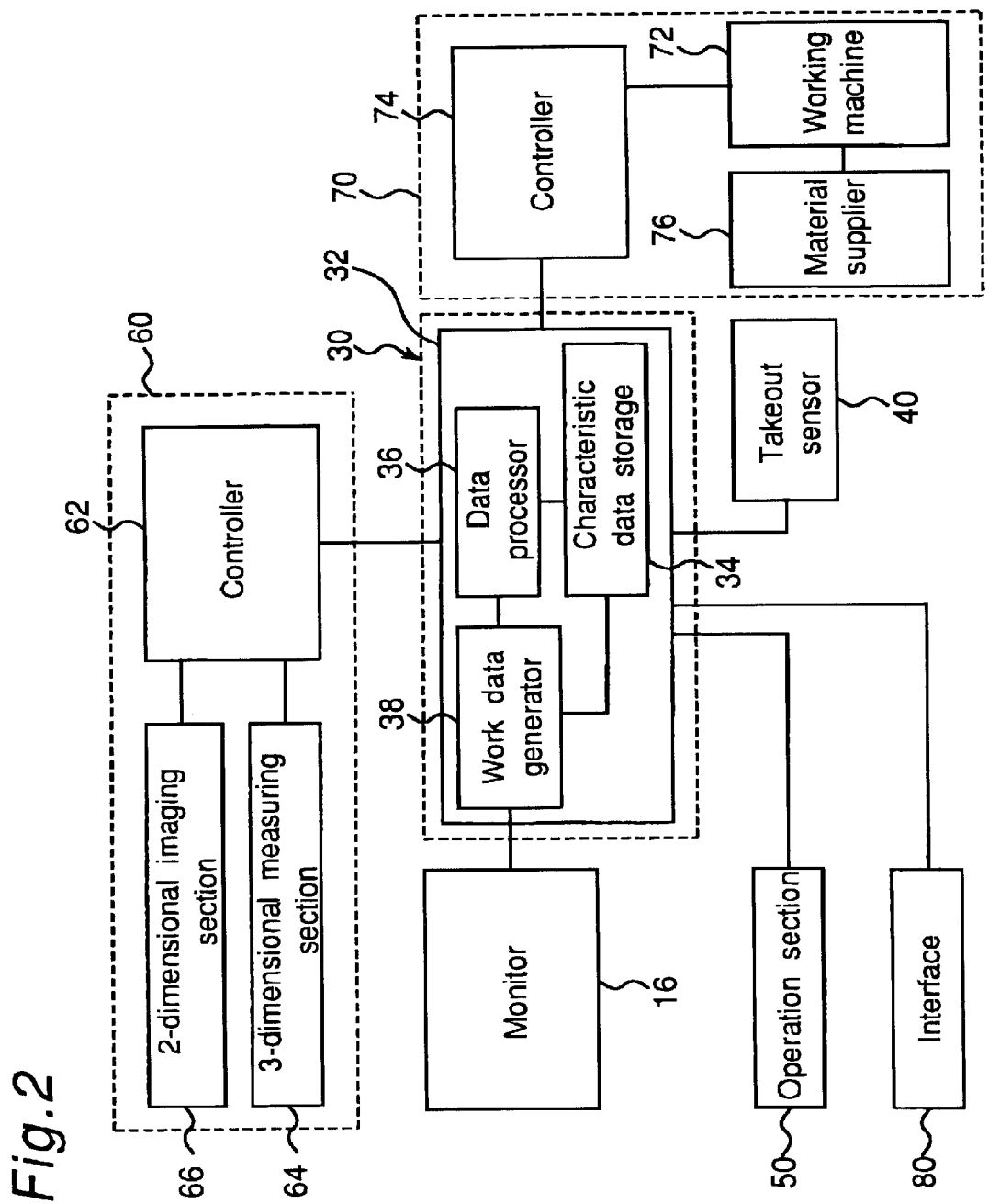
FIG. 2 is a block diagram of devices and instruments of the three-dimensional reproduction apparatus.

FIG. 2 is a block diagram of components of the three-dimensional reproduction apparatus. A control section 30 which controls the entire apparatus is connected to a display device 16 (including a monitor), an operation section 50, a measuring section 60 and a working section 70. The control section 30 has a main controller 32 including a characteristics data storage device 34, a data processor 36 and a work data generator 38. The storage device 34 stores various databases mentioned below. A takeout sensor 40 is provided at the outlet 20 to detect takeout of the three-dimensional reproduction, and it is connected to the main controller 32. The operation section SO has the operation panel 18. The measuring section 60 has a three-dimensional measuring section 64 (having the light projection window 12 and the light receive window 14) and a two-dimensional measuring section 66 (using the windows 12 and 14 in common), and they are controlled by a controller 62 of the measuring section 60. The working section 70 has a working machine 72 controlled by a controller 74 of the working section 70, and the working machine 72 works a material supplied from a material supplier 76. The main controller 32 may have the functions of the controllers 62 and 74 of the measuring section 60 and the working section 70 in order to control the whole apparatus. Further, an interface 80 is connected to the main controller 32 in order to receive data from an external apparatus (not shown). Thus, working is performed based on the input three-dimensional data received from the external apparatus.

Figure 3:
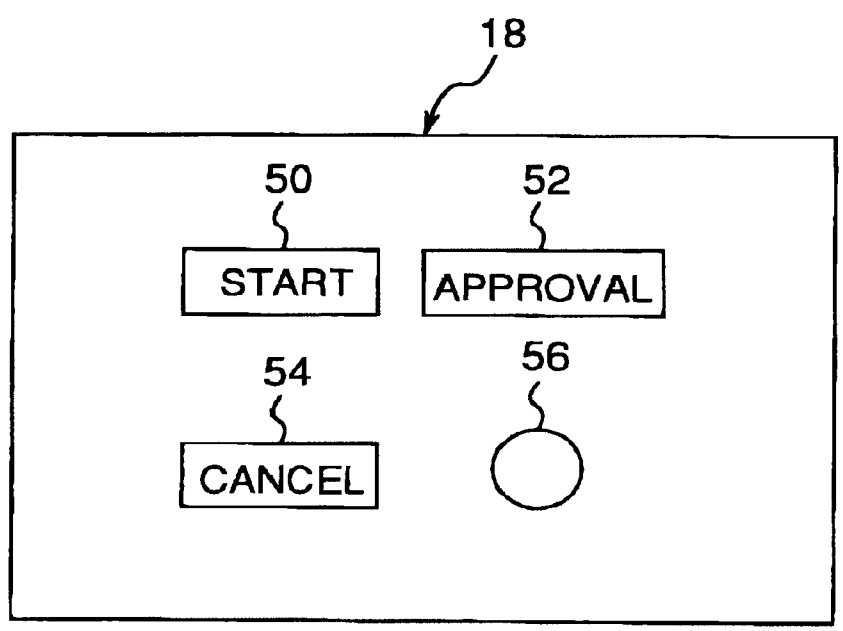
FIG. 3 is a diagram of an operation panel.

FIG. 3 shows the operation panel 18 having a start button 50, an approval button 52 and a cancel button 54. Further, it has a joy stick 56 shown schematically. The start button 50 is pressed when a user determines the composition. The approval button 52 is pressed when a user approves the three-dimensional display. The cancel button 54 is pressed when a user wants a different composition if the three-dimensional display is different from the image the user supposes. The joy stick 56 is used to instruct rotation of the three-dimensional image in various three-dimensional directions when the image is displayed in the display device 16.

Figure 4:
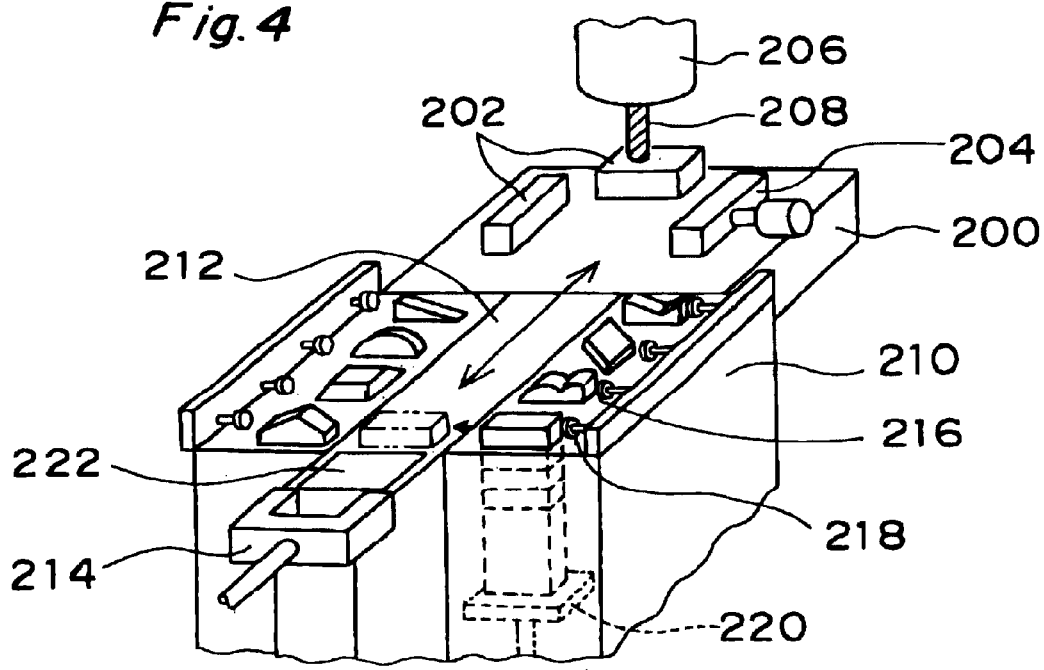
FIG. 4 is a perspective view of a working machine and a material supplier.

FIG. 4 shows a perspective view of the working machine 72 and the material supplier 76 in the working section 70 which forms a reproduction with a pusher system. A material to be worked is fixed on a table 200 with two positioning jigs 202 and a clamping jig 204. A tool 206 provided for working cuts the material with a drill 208. Eight types of materials are provided in a stock section 210 in the material supplier 75. In the stock section 210, the eight types of materials whose shapes are shown schematically as examples are stacked on an elevator 220, and a material at the top of one of the stacks is pushed by a pusher 218 towards a transport path 212 provided at the center of the material stock section 210 (refer to an arrow shown in FIG. 4). A pusher/puller 214 provided at an end of the transport path 212 pushes the material pushed thereto from the material stock section 210 towards the table 200. Further, the pusher/puller 214 pulls the material worked at the table 200 and sends it through a product outlet 222. Alternately, the transport path 212 itself may be used as a slide to move the material, without using the pusher/puller 214.

Figure 5:
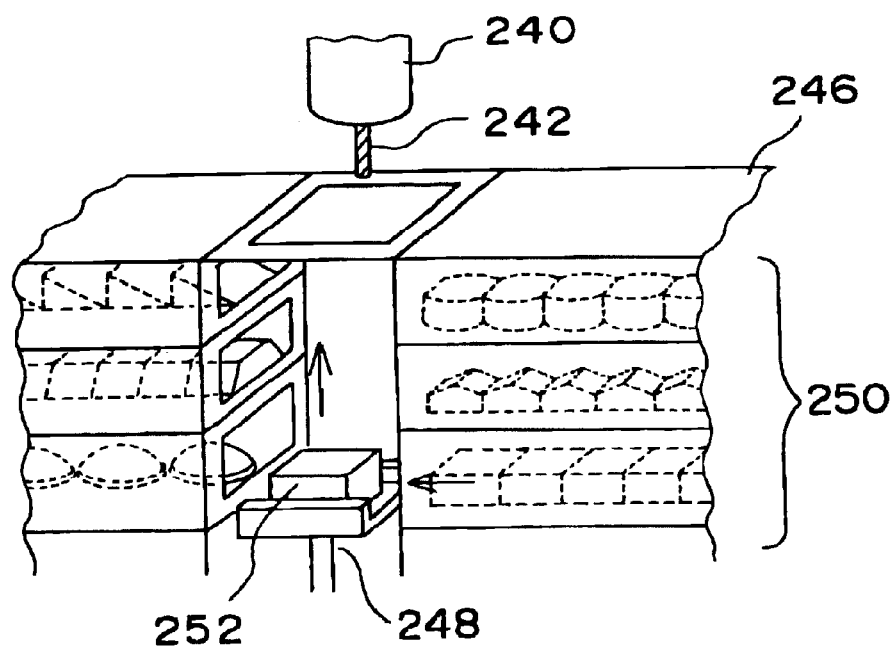
FIG. 5 is a perspective view of a modified example of the working machine and the material supplier.

FIG. 5 shows a perspective view of a modified example of the working machine 72 and the material supplier 76 of the elevator type in the working section 70. Six types of materials are provided in a stock section 250, and these materials are arranged in three steps at the right and left sides. A material 252 selected in the material stock section 250 is pushed on a plate of an elevator 248 located at the center of the stock section 250, and the plate has positioning jigs and a clamping jig in order to fix the material 252. After the elevator 248 moves upward to a predetermined position, the tool 240 cuts the material 252 with the drill 242.

Figure 6:
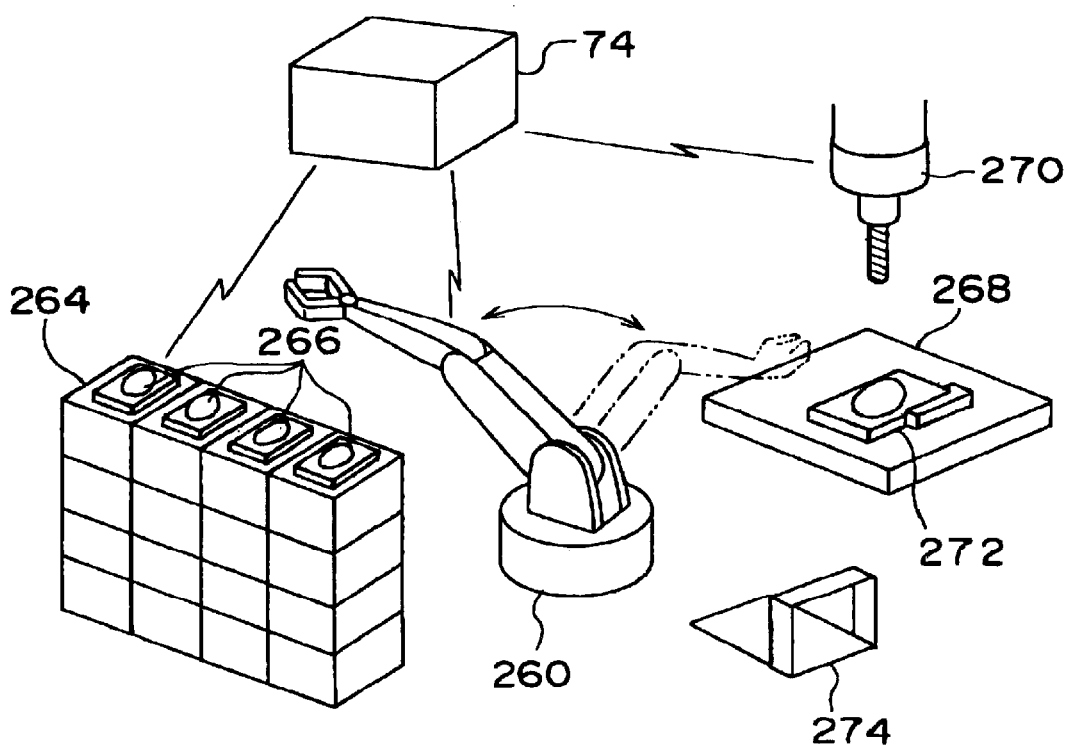
FIG. 6 is a perspective view of a further modified example of the working machine and the material supplier.

FIG. 6 shows a perspective view of a further modified example of the working machine 72 and the material supplier 76 in the working section 70. The controller 72 controls a robot 260, a material stocker 264 and a tool 270 used for working. The material stocker 264 stocks a plurality of types of materials 266. The robot 260 carries one material 266 from the material stocker 264 to a stage 268. The material 266 is fixed at working position on the stage 268 with positioning jigs 272 and worked with the tool 270. After the working, the product is carried to a takeout outlet 274.

In the apparatuses shown in FIGS. 4–6, the material is worked mechanically with cutting. However, other processes may be used such as laminated forming method (including solid creating), laser working (heat working), or forming (pressurizing).

As shown in FIGS. 4–6, the material supplier 76 supplies a material selected among a plurality of types of material. If the material has an uneven shape, it is difficult to stack them in the material supplier 76. However, even in such a case, a material can be supplied by providing a tube-like guide. It is also possible to prepare a plurality of standard types of face-like materials for selection.

Figure 7:
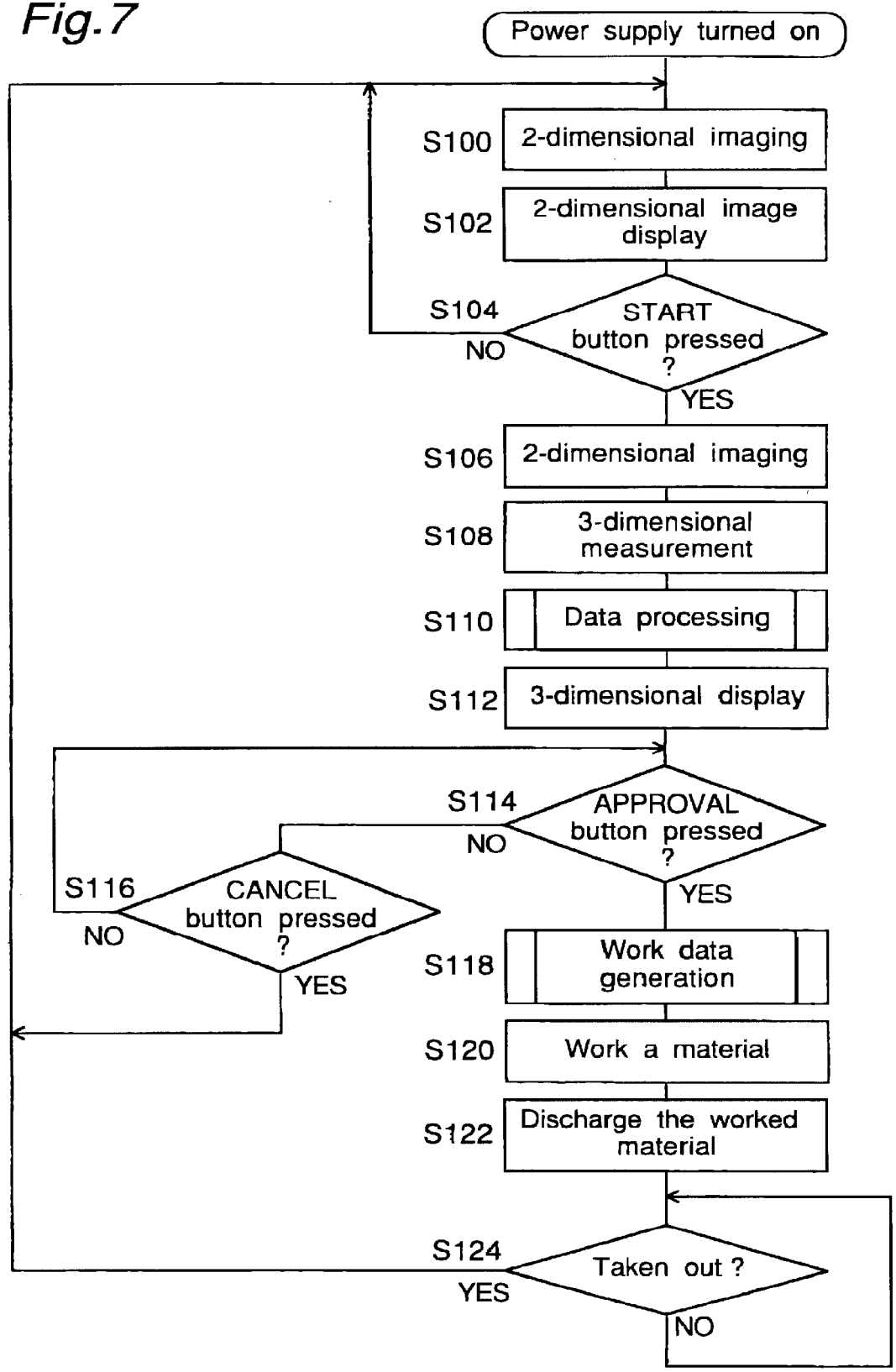
FIG. 7 is a main flowchart of a main controller.

FIG. 7 is a main flow of the main controller 32 of the controller 30. Until the start button 50 is pressed by a user with the operation panel 18, a two-dimensional image is displayed in the display device 16 as a moving picture in order to help the user to determine a desired composition. First, a two-dimensional image of user's face is picked up by the two-dimensional imaging section 66 (step S100), and the obtained two-dimensional image is displayed in the display device 16 (step S102). Then, it is waited that the user presses the start button 50 (step S104). Until the user is satisfied by the composition, the display of the two-dimensional image is repeated. When the user determines the composition, he or she presses the start button 50 in the operation panel 18.

When the press of the start button 50 is detected (YES at step S104), a two-dimensional image of the user's face is picked up by the two-dimensional imaging section 66 (step S106), and a three-dimensional image of the user's face is measured by the three-dimensional measuring section 64 (step S108). Next, the measurement data are processed (step S110). As will be explained later, form data are compressed in the height direction for height correction at this step, so that a time for working the material is shortened. Further, as will be explained also later, the data is converted according to the shape and the quality on the product or the three-dimensional form data. Thus, form measurement data are converted automatically according to the shape (size or the like) and the quality (density of data, smoothness or the like) of the product (the three-dimensional model), to simplify a series of processes from form data input to working.

Next, a three-dimensional form after the data processing is displayed in the display device 16, and the user's instruction is waited. By referring to the display, the user can confirm results of the actual working. As the three-dimensional display, various known techniques such as shadow display can be adopted. When the user presses the approval button 52 in the operation panel 18, the pressing of the approval button 52 is detected (YES at step S114), and working is started. However, if the user presses the cancel button 54 (YES at step S116), the flow returns to step S100, so that the user can take a different composition. Because the working is started after the user approves the image after the data processing, a three-dimensional reproduction which is desired by the user can be produced, and the working is performed efficiently, without waste of material and time.

Figure 8:
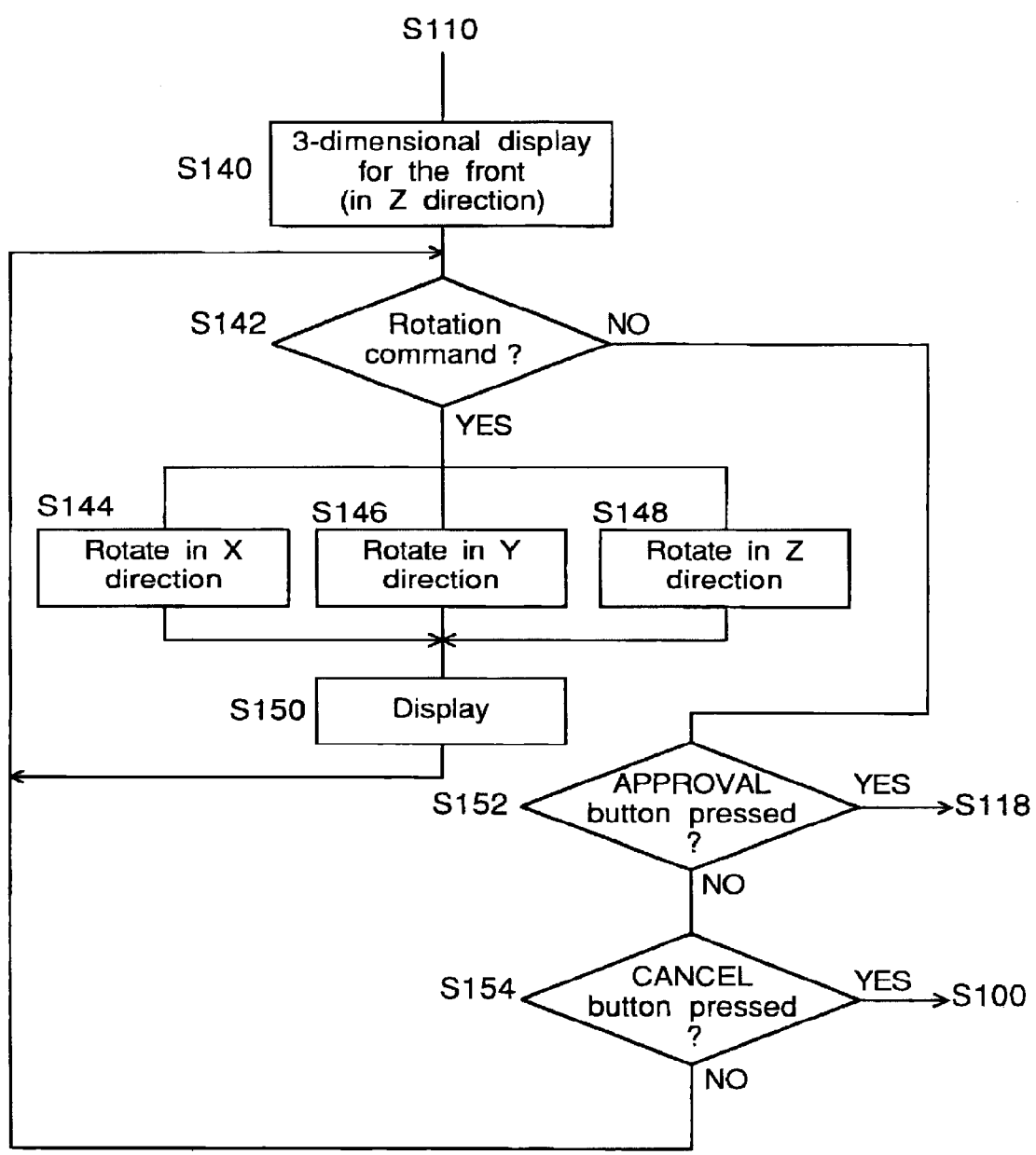
FIG. 8 is a main flowchart of a modified example of the main controller.

FIG. 8 shows a flow of a modified example using the joy stick 58 wherein the user can confirm the image after the data processing in various directions by operating the joy stick 58. After the data processing (step S110) shown in FIG. 7, a three-dimensional image viewed from the front (in the Z direction) is displayed in the display device 16 (step S140). Next, when the user operates the joy stick 58, the flow branches according to the rotation instruction from the joy stick 58 (step S142). Rotation in the X direction (step S144), in the Y direction (step S146) or in the Z direction (step S148) is performed according to the rotation instruction in the X direction, in the Y direction or in the Z direction, and the three-dimensional image according to the rotation is displayed (step 5150). Thus, the user can confirm the three-dimensional reproduction in various directions. If the user presses the approval button 52 in the operation panel 18 (YES at step S152), the flow proceeds to step S118 for the working. If the user presses the cancel button 54 in the operation panel 18 (YES at step S154), the flow returns to step S100 for a next reproduction.

Referring again to FIG. 7, work data is generated according to the form data by referring to a working condition database (step S118). The form data are sent to the working section 70, and the working section 70 works the material to produce a three-dimensional product (step S120). Then, the product is discharged (step S122), and when takeout thereof is detected by the sensor 40 (YES at step S124), the flow returns to step S100 for a next reproduction.

In an alternative way, three-dimensional data are received through the interface 80 from an external apparatus. In this case, the flow proceeds readily to step S110 for the data processing. If the cancel button is pressed, the data input from the external apparatus is waited. The other processing is similar to that shown in FIGS. 7 and 8.

Figure 9:
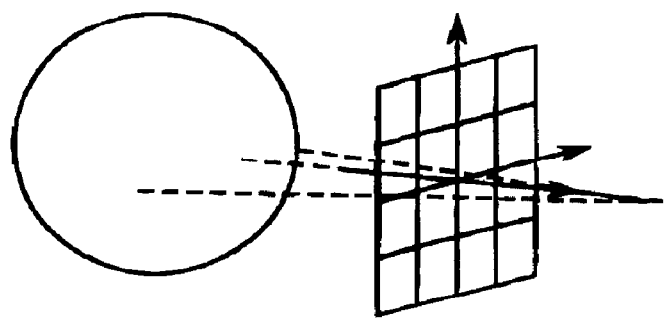
FIG. 9 is a diagram for illustrating sampling on converging projection plane.
Figure 10:
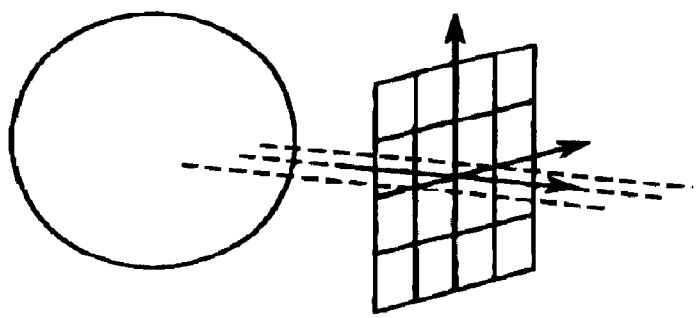
FIG. 10 is a diagram for illustrating sampling on parallel projection plane.

Next, the reproduction of the three-dimensional object is explained in detail. In the three-dimensional measurement (step S112 in FIG. 7), the three-dimensional form of a three-dimensional object (face) is measured. As shown in FIG. 9, the three-dimensional measuring section 64 measures distances from the measuring section 64 to points at which converging viewing lines which pass lattice points arranged in a conversion projection plane cross first with a surface of a three-dimensional object (face) Then, form data are given as data at lattice-like points having the distance value and coordinate values in three-dimensional rectangular coordinate system having the center at a predetermined position in the three-dimensional measuring section 64. If a measuring point for which measurement cannot be performed, for example because it is outside the measuring range, the data thereon is stored as data with a defect mark. As explained above, the sampling is performed in the projection plane in the embodiment. However, in the three-dimensional measurement, as shown in FIG. 10, distances from the measuring section 64 to points at which parallel viewing lines which pass lattice points arranged in a parallel projection plane cross first with a surface of the body.

Figure 11:
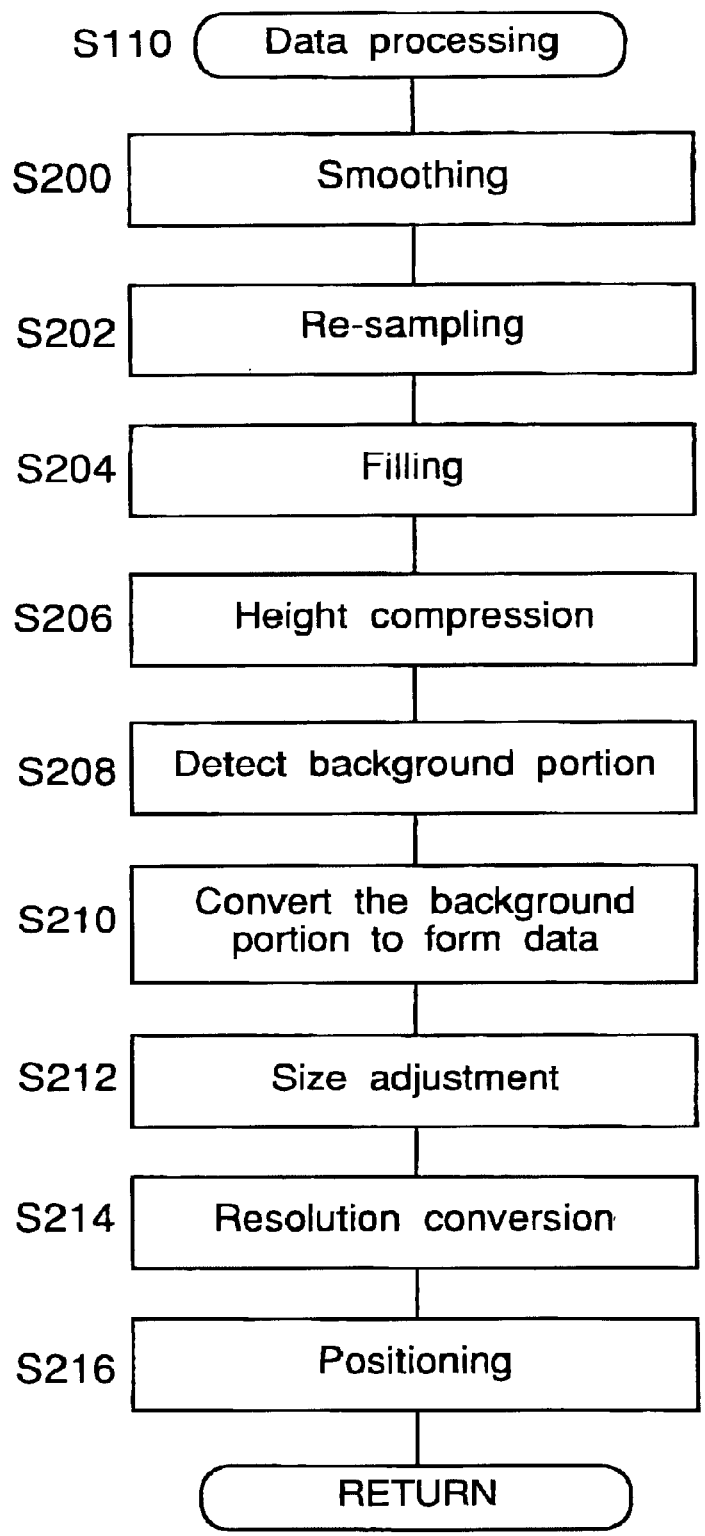
FIG. 11 is a flowchart of data processing.

FIG. 11 shows a flow of the data processing (step S110 in FIG. 7) wherein the form data received from the three-dimensional measuring section 64 are subjected to various processings including processing for shortening a working time. This flow corresponds to the data processor 36 shown in FIG. 2. First, the measurement data are smoothed to remove noises such as irregular data (step S200).

Figure 12:
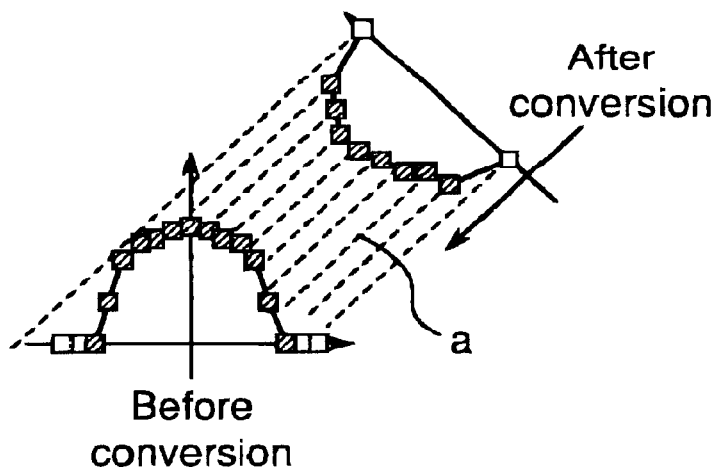
FIG. 12 is a diagram for explaining re-sampling.

Next, re-sampling is performed (step S202). If for example the face turns to a tilted direction, in order to make the input data oppose to the working direction, the data are converted to data aligned with lattice points projected in parallel in a particular direction and having equal distances. FIG. 12 shows an example. For example, if a portion below the nose in the face is not measured by the shadow thereof, three-dimensional measurement is performed by making the face upward, and the data is converted next so as for the face to oppose the front. If there are no measurement points at the position to which lattice points are projected (for example, "a" in FIG. 12), linear interpolation is performed by using measurement data of the surrounding thereof. At this time, the projection direction is converted to the up side of the vertical line when the material is worked, and each lattice point has height data. Further, if for example the input data are not obtained with parallel projection, the input data can be converted to parallel projection data.

Next, filling (step S204 in FIG. 11) is performed to fill data at defect portions having no data. Various techniques such as linear interpolation or weight interpolation are used for the interpolation. For example, the portions having no data are all replaced at fixed values (simple interpolation). The fixed value may be (a) a predetermined value, (b) a minimum height, or (c) an average of the data at the outer peripheral. If a portion having no data are surrounded completely with data, linear interpolation is performed according to the surrounding data.

There are portions such as black eyebrow or black hair in a human face where no data can be obtained by the optical three-dimensional measuring section 64 due to the properties of the portions to be measured. In such a case, the portions having no data are replaced with predetermined three-dimensional form data. That is, predetermined standard face data are prepared, and the model data are used for the portions having no data. At this time, the position and the size have to adjusted. For example, the triangle of the two eyes and the mouth in the color image of the three-dimensional data obtained at step S106 in FIG. 7 are converted linearly so as to correspond to the triangle of the model. The synthesis is not limited to defect portions in the face, and desired three-dimensional form data can be used.

Next, height compression (step S206 in FIG. 11) is performed to compress the form data in the height direction so that the range in the height direction becomes narrower than the original data. When the unevenness in the height direction is larger, the working time is longer. By using compression in the height direction, a length to be worked becomes shorter and the working time becomes shorter. Further, a portion to be worked becomes shorter by converting a portion having a very large depth (background) to predetermined data (data having shallow depth), and the working time becomes shorter. The height compression is explained in detail below.

An appropriate technique of height compression may be adopted according to the properties of an object to be worked. Techniques of height compression divided into uniform compression and nonuniform compression.

Figure 13:
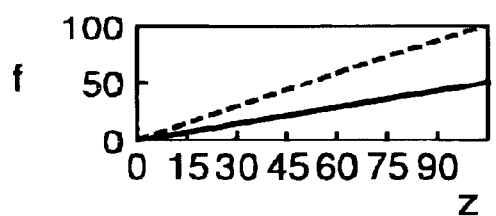
FIG. 13 is a first diagram of height compression.

Various algorithms as shown in FIGS. 13 to 17 may be used for uniform compression. In uniform compression, height $z_i$ at a lattice point i is converted to a value according to a function $Z=f(z_i)$. One technique is a linear conversion $f_1(z)=a*z+b$, wherein z denotes height, and a and b denote constants, and $0<a<1$. FIG. 13 shows an example of the linear conversion, $f_1(z)=0.5*z$.

Figure 14:
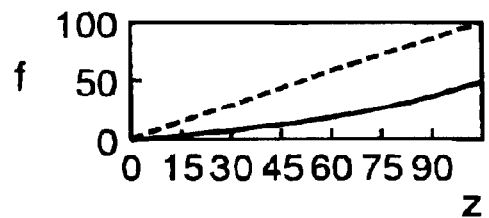
FIG. 14 is a second diagram of height compression.
Figure 15:
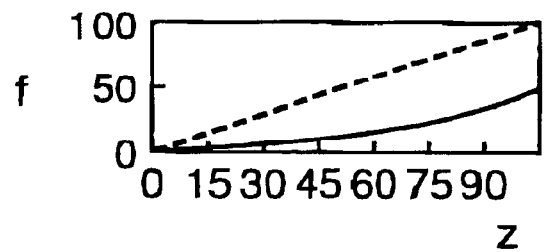
FIG. 15 is a third diagram of height compression.

FIGS. 14 and 15 show examples of nonlinear discontinuous conversion. As to data especially on a human face or the like, characteristic portions are centered on high points (or at the side opposing the three-dimensional measuring section when the three-dimensional data are obtained). Then, the degree of compression is increased at low points. One technique is square conversion, $f_2(Z)=a(z-b)^2+c$ wherein z represents height, a, b and c represent constants and $0<a$. FIG. 14 shows an example of square conversion, $f_2(z)=0.005*z^2$. Another technique is exponential conversion, $f_3(z)=c*b^{az}+d$ wherein $1<a$. FIG. 15 shows an example of the exponential conversion $f_3(z)=8*1.02^z$.

Figure 16:
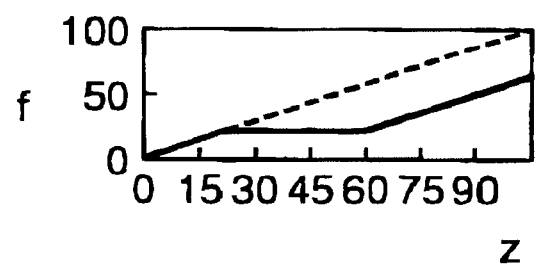
FIG. 16 is a fourth diagram of height compression.
Figure 17:
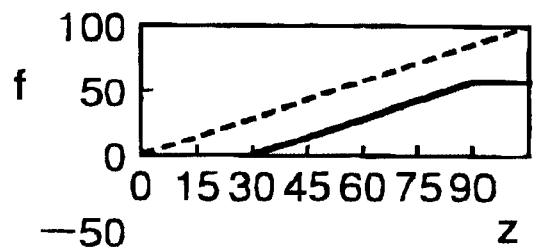
FIG. 17 is a fifth diagram of height compression.

FIGS. 16 and 17 show examples of nonlinear discontinuous conversion which deletes unnecessary part. One technique is conversion which omits a middle portion as shown below.

$$f_4(z) = z \quad \text{for } z < d_1,$$
$$= d_1 \quad \text{for } d_1 \leq z \leq d_2,$$
and
$$= z + d_1 - d_2 \quad \text{for } d_2 < z.$$

This conversion is used for example to omit a portion from ear to cheek for a human face. FIG. 16 shows an example where $d_1=20$ and $d_2=60$. Another technique is clipping as shown in the following relation where the data outside a predetermined range is set constant. FIG. 17 shows an example of clipping.

$$f_5(z) = 0 \quad \text{for } z < 30,$$
$$= z \quad \text{for } 30 \leq z \leq 80,$$
and
$$= 50 \quad \text{for } 80 \leq z.$$

Then, data z smaller than the first predetermined value is set to 0, while data z larger than the second predetermined value is set to the constant value of 50.

In nonuniform compression, height $z_1$ at lattice point i is converted to a value according to a function $Z=g(x_1, y_1, z_1)$ wherein x and y denote coordinates of the lattice. As to data especially on a human face or the like, characteristic portions are located around the center. Then, the degree of compression is increased at portions at the peripheral thereof. At this time, data at the center have to be estimated from three-dimensional data or color image data. For example, as to a face, the center of gravity of the three-dimensional data in correspondence to a triangle of two eyes and a mouse extracted from the color image is set as the center of the data. Alternately, positioning is needed to set the center of the object to a predetermined position. one technique is conversion of point symmetry. A following equation shows an example of the conversion of point symmetry.

$$g_1(z)=z*f(c-((x-a)^2+(y-b)^2)^{1/2}),$$

wherein f denotes one of the above-mentioned functions of the uniform compression, and y=b is the coordinate at the data center.

Another technique is conversion of line symmetry. A following equation shows an example of the conversion of line symmetry.

$$g_2(z)=z*f(c-|y-b|),$$

wherein f denotes one of the above-mentioned functions used for the uniform compression, and (x, y)=(a, b) are the coordinates at the data center. For example, as to the right and left of the face, conversion of line symmetry is performed.

It is also possible to combine the uniform conversion with nonuniform conversion. An example is shown as follows.

$$g_3(z)=f(z)*f(c-((x-a)^2+(y-b)^2)^{1/2}),$$

wherein f denotes one of the above-mentioned functions used for the uniform compression.

Referring again to FIG. 11, next, the background portion of the three-dimensional form data is detected (step S208). Thus, the background, or a portion having very deep depth, is converted to data having a shallow depth, to shorten working time. Next, the background portion is converted to predetermined form data and synthesized with the three-dimensional form data of the object (step S210). The predetermined form data may be data of a constant height, or data of uneven shape. Further, form data of a different three-dimensional body such as flowers or trees may be synthesized. As an example, the blue back is provided behind an object to be measured, and if the depth exceeds a predetermined value and the color of the two-dimensional image at the area is blue, it is decided to be a background.

Figure 18:
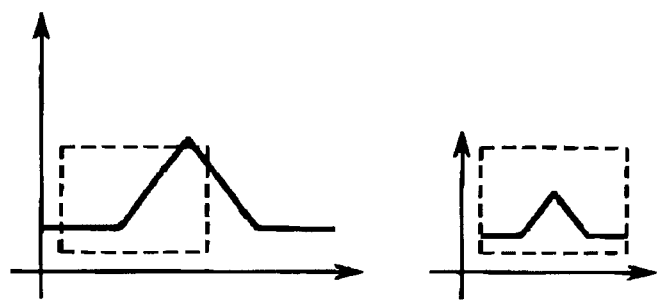
FIG. 18 is a diagram for explaining size adjustment and positioning.

Next, conversion of three-dimensional form data based on the form and the quality of three-dimensional data is explained (steps S212–S216 in FIG. 11). First, the size is adjusted (step S212 in FIG. 11), to change the scale according to the range to be worked or the size of the material to be worked by multiplying a constant to coordinate values. In an example shown in FIG. 18, the data at the left side is converted to data at the right side to correspond to the size of the material to be worked as displayed with dashed line.

Figure 19:
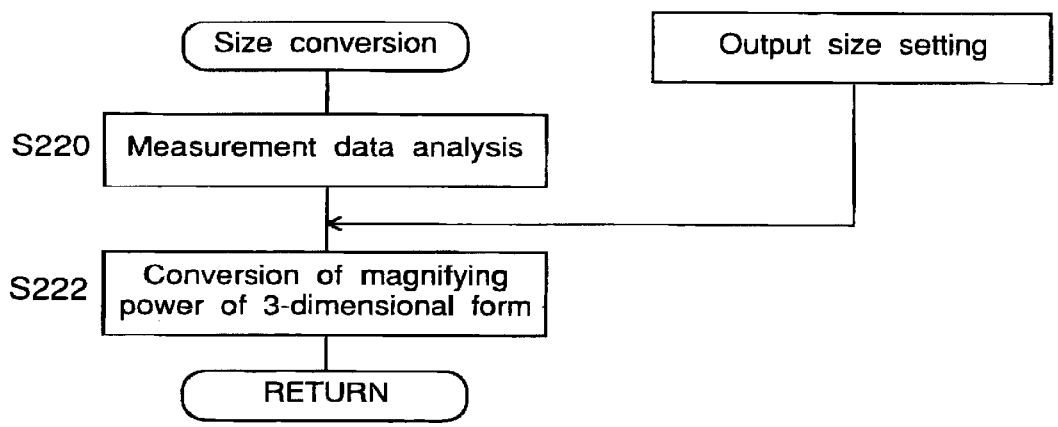
FIG. 19 is a flowchart of size conversion.

FIG. 19 shows a flow of size conversion as an example of the size adjustment. Form analysis is performed on the three-dimensional data received from the three-dimensional measuring section 64 (step S220 in FIG. 11). The size (length, width and depth) of the object calculated by the form analysis is compared with the size data of an output model set in the characteristic data storage device 36, and the magnifying power of the three-dimensional form is changed for adjusting the object to the output model size (step S222 in FIG. 11). By using the magnifying power, the three-dimensional data are converted to generate output model form. Work data are generated based on the output model form with reference to working conditions set in the characteristics data storage device 36 in the controller 30 (step S118 in FIG. 7). The work data are sent to the working section 70, where three-dimensional working is performed to produce a three-dimensional model. Thus, because form measurement data are converted automatically according to the form and the quality to be realized, the three-dimensional form data can be generated stably and easily in the predetermined specification.

Figure 20:
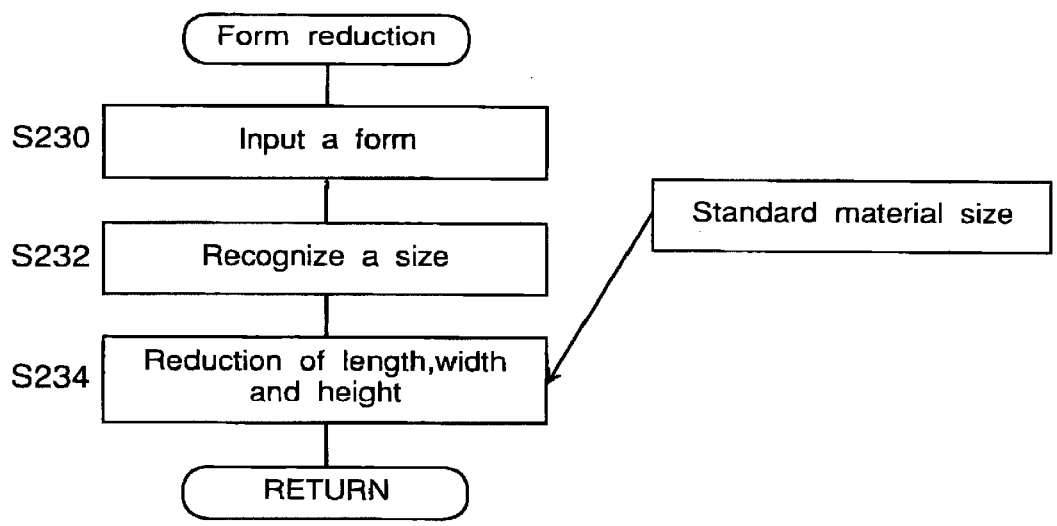
FIG. 20 is a flowchart of form reduction.

FIG. 20 shows a flow of working size reduction as a modified example of the size conversion. In this flow, the form data is scaled in the directions of length, width and height to reduce to a size which is included in the material of a predetermined size. Thus, the volume to be worked is decreased, and the working time is shortened. First, the form data is input (step S230), and the current size of the input form data is recognized (step S232). Next, the current size is scaled in the directions of length, width and height according to the size of the material to be used as a standard which is read from the characteristic data storage device 36 (step S234). Especially if the size is reduced extremely in the height direction, the working speed is increased.

Figure 21:
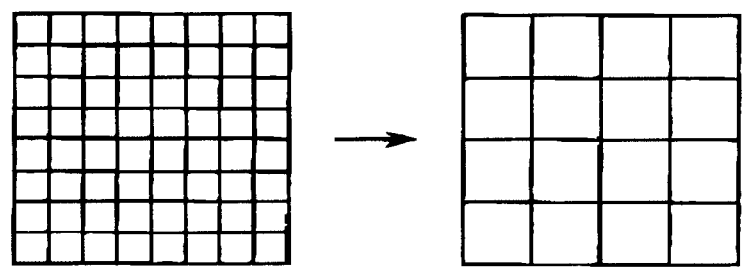
FIG. 21 is a diagram for explaining resolution conversion.

Next, resolution conversion (step S214 in FIG. 11) is performed to re-sample the data at lattice points of different lattice width according to the precision of the working machine 72. This process is similar to the resampling at step S202, but the projection direction is fixed to Z direction (upward along the vertical direction). As shown in FIG. 21, the lattice points of the data shown at the left side are matched to the lattice points of the working machine shown in the right side. Thus, after the size is adjusted at step S212 according to the working, the resolution is converted and the form data are converted according to the resolution. Therefore, even if the precision of the working is lower, appropriate form data can be obtained.

Figure 22:
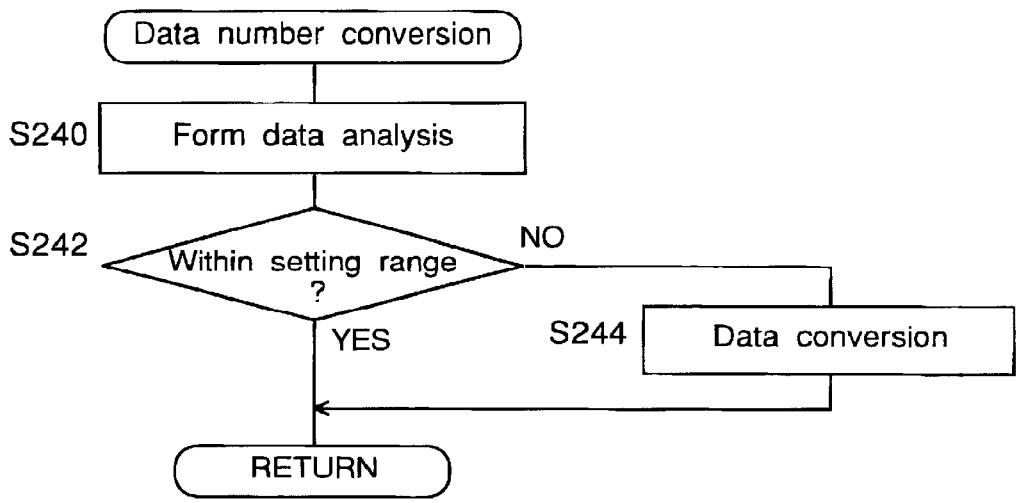
FIG. 22 is a flowchart of data thinning.

FIG. 22 shows a flow of data number conversion for the resolution conversion (step S214 in FIG. 11). The form quality of size output model is set by defining the group of constituent points with pitches between the points and the vectors shifts, and a range of the pitch in correspondence to the vector shift is set by reading it from the characteristic data storage device 36. If the pitch is outside the range, data conversion (resolution conversion) is performed to make the pitch set within the range. In the flow shown in FIG. 22, the form data in correspondence to the magnifying power obtained in the flow shown in FIG. 19 are analyzed, to obtain the pitch between the points and the vector shifts (step S240). Next, it is decided if the pitch between the points are within the range thereof by referring to the pitch between the points and the range of the pitch set according to the vector shifts (step S242). This decision is necessary when the input device is not set because the resolution depends on a measuring instrument and measurement conditions. If the pitch is decided not to be within the range, the data are converted (step S244). As to a complicated part having a large vector shift, the pitch is set in a range of larger values, while as to a part having a small vector shift, the pitch is set in a range of smaller values. If the pitch is too small, the data are thinned out for increasing the pitch, while if the pitch is too large, the data are interpolated for decreasing the pitch in order to set the pitch within the range thereof.

Figure 23:
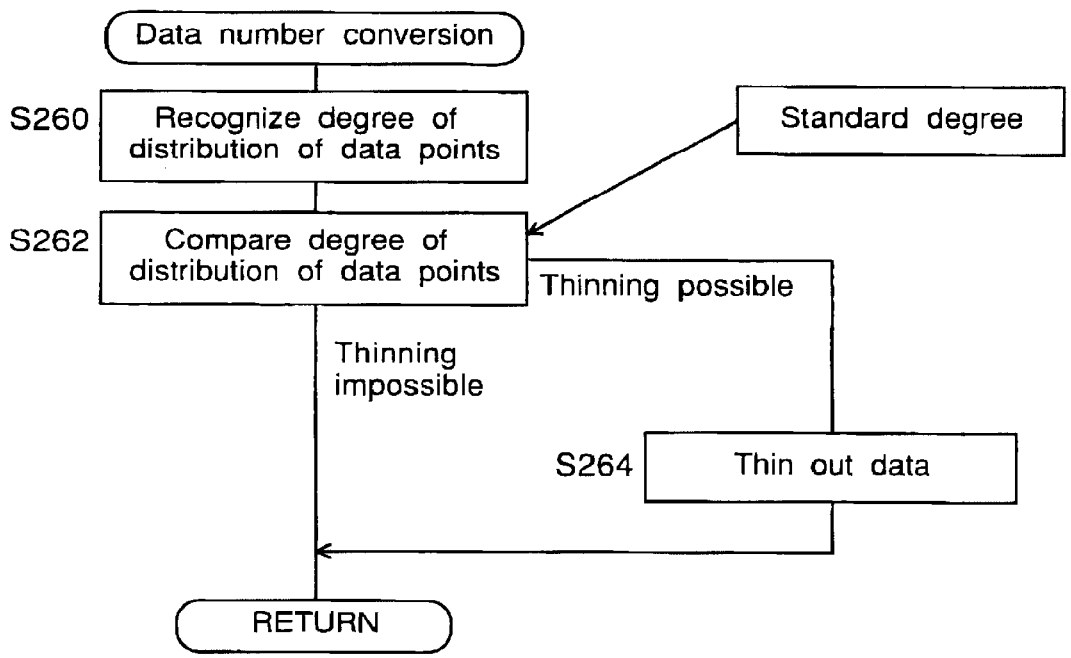
FIG. 23 is a flowchart of data number conversion.

If the measured form data have sufficient resolution, only the thinning processing is performed. An example is explained below. FIG. 23 shows a flow of thinning of the form data for the data number conversion. In this flow, data which can be omitted are thinned out according to the required form precision (the above-mentioned pitch between the points and the vector shifts) for realizing working at a fast speed. First, the degree of distribution of the input form data (the pitch between the points and the vector shifts) is recognized (step S260). Next, the pitch between the points and the vector shifts are compared with the pitch range in correspondence to the vector shift (step S262). If data thinning is possible, the data are thinned out (step S264).

In the data processing, finally, the positioning (step S216 in FIG. 11) is performed. That is, the origin of the coordinates is moved in parallel so that the reference position of the three-dimensional data matches that of the working range.

Next, the generation of the work data (step S118 in FIG. 7) is explained. A plurality of types of materials are prepared in the material supplier 76 in the working section 70. Then, characteristics of the input form data are extracted, and a material having a similar form to the extracted characteristics is selected. Thus, the volume to be worked is decreased, and the working time is shortened. Further, roughing for producing the form of the material to be finished becomes unnecessary, and the life of a tool is lengthened because the working time is shortened. Various quantities can be used as the characteristics. In an example explained below, pattern matching is used. The pattern of the form data is compared with those of the materials, and a material having the most similar pattern is selected.

Figure 24:
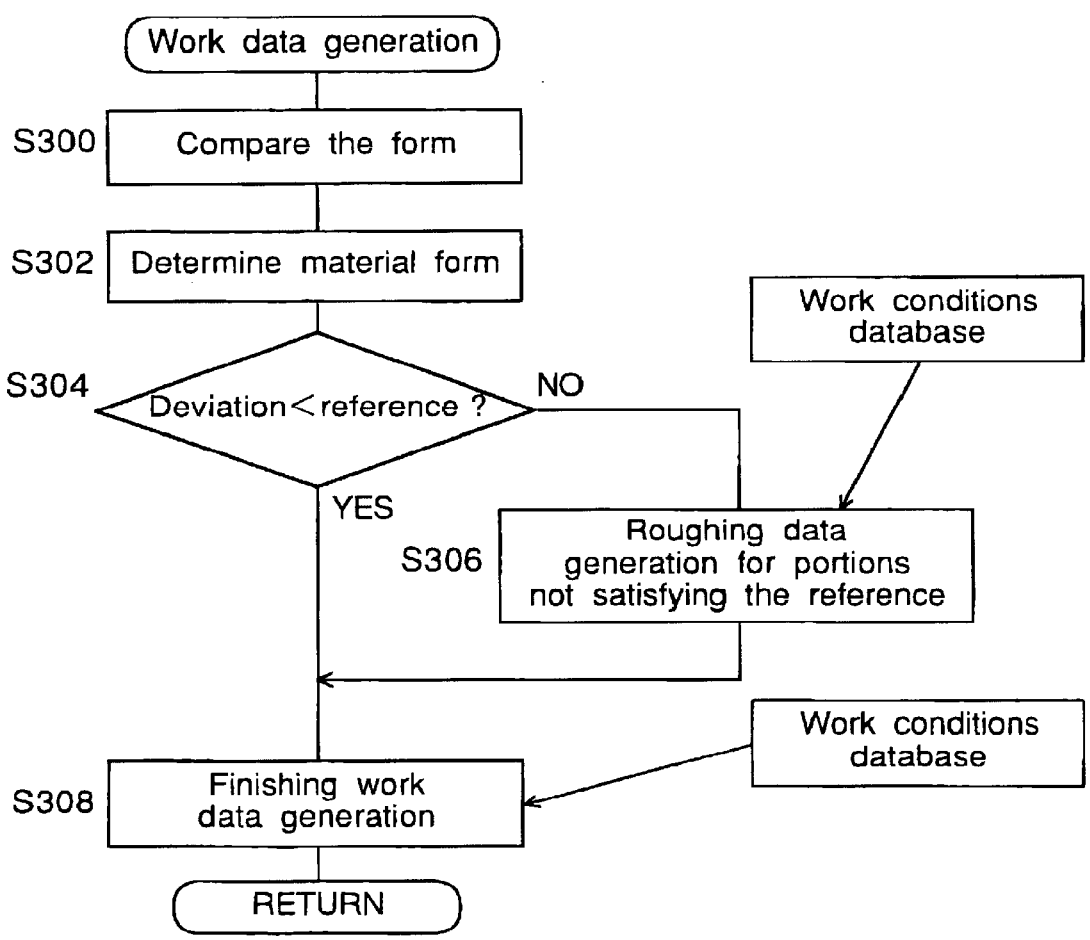
FIG. 24 is a flowchart of work data generation.

FIG. 24 shows an example of a flow of generation of the work data. This flow corresponds to the work data generator 38 shown in FIG. 2. The data obtained by the three-dimensional measuring section 64 have been converted to form data (coordinate data) by the above-mentioned data processing. Then, the form data is patterned to a level which can be compared with form data (material patterns) of the materials stored in the material database, and the form data (coordinate data) is compared with the form data (material patterns) of the materials to extract characteristics (step S300). For example, a sum of the differences in the height direction is obtained. Then, the material form is determined according to the comparison (step S302). For example, the material having the smallest sum of the differences is selected.

Next, the deviation for determining the material form is compared with a reference value of the deviation (step S304). If the deviation is larger than the reference value, work data for roughing is generated by referring to the working conditions database (step S306). Next, work data for finishing is generated by referring to the working conditions database (step S308). The work data for the roughing and for finishing are used as data for operating the working machine 72. The working section 70 carries the determined material to a working position, and the material is worked according to the work data.

In the above flow, roughing is performed at the portions having the deviation exceeding the reference value. Alternatively, the working speed is decreased at the portions without using roughing. Then, the load at the tool is decreased, and a damage of the working machine can be prevented.

Figure 25:
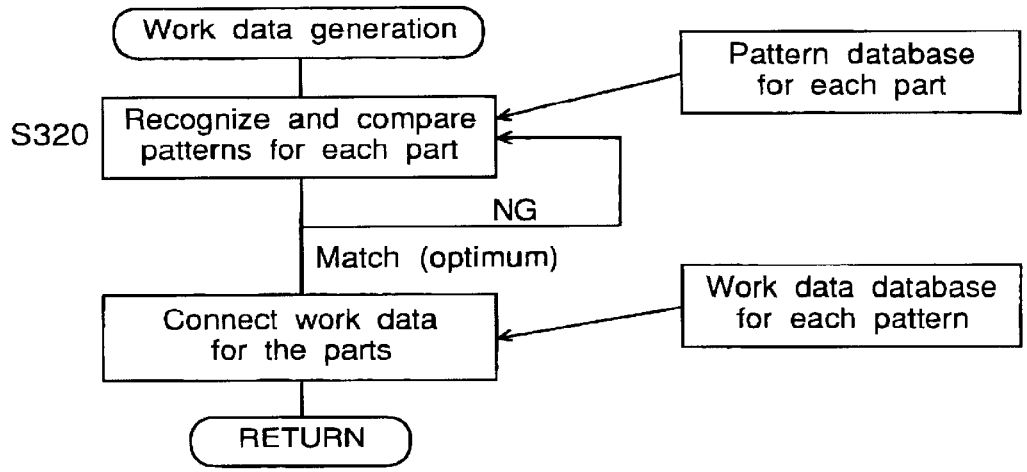
FIG. 25 is a flowchart of a modified example of work data generation.

The generation of the work data (steps S306 and S308) takes a long time. Then, in order to shorten the time, work data prepared beforehand can be used. FIG. 25 shows a flow of a modified example. First, patterns are recognized for each part of the form data, and they are compared to search a matched or similar pattern by referring the pattern database for each part (step S320). Next, the work data are specified from the work data database for each pattern as shown in Table 1 according to the searched pattern and the predetermined material. Then, the work data are combined to set the entire work data (step S322).

TABLE 1

Work data in correspondence to pattern and material

| Pattern | Material A | Material B | Material C |
|---|---|---|---|
| 1 | Work data 1 | Work data 2 | Work data 3 |
| 2 | Work data 4 | Work data s | Work data 6 |
| 3 | Work data 7 | Work data 8 | Work data 9 |

TABLE 1-continued

Work data in correspondence to pattern and material

| Pattern | Material A | Material B | Material C |
|---|---|---|---|
| 4 | Work data 10 | Work data 11 | Work data 12 |

Figure 26:
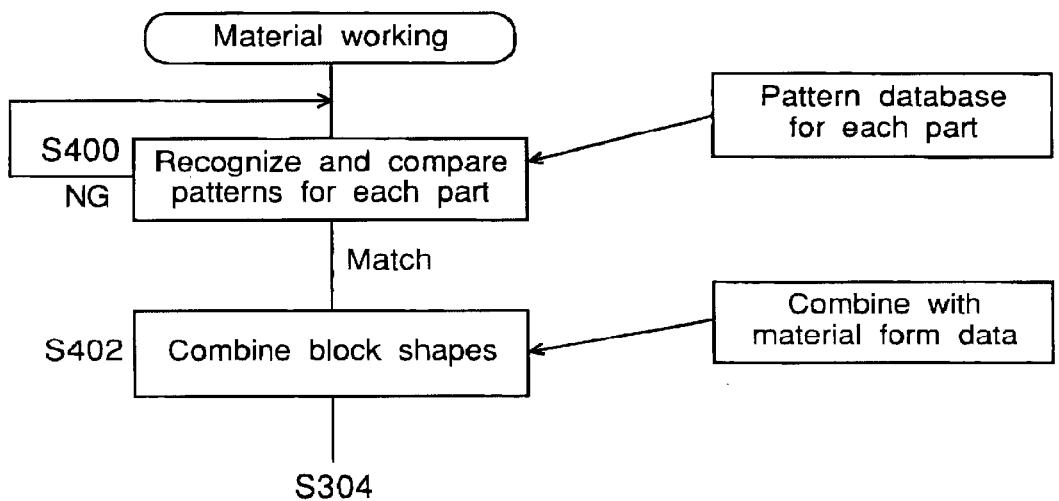
FIG. 26 is a flowchart of material working.

In a modified embodiment, a material to be worked is prepared by combining the basic parts. FIG. 26 shows a flow in this case. First, a pattern is recognized for each part (basic part), and it is compared to search a matched or similar basic part with reference to the pattern database for each portion (step S400). Next, the matched or similar basic parts are combined as the material for working (step S402). Next, the flow proceeds to step S304 in FIG. 24 for generating work data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reproduction apparatus comprising:
   a measuring device for measuring a three-dimensional form of an object to generate form data thereof;
   a display device for displaying the form of the object based on the form data generated by said measuring device;
   a first input device operable by a user, said first input device including an input portion for approving or canceling the form of the object on the display;
   a working apparatus for working a material so as to reproduce the measured three-dimensional form data; and
   a controller for making said work apparatus start working based on an approval at said first input device inputted after the form of the object is displayed at said display device.

2. The apparatus according to claim 1, further comprising:
   a pickup device for picking up a two-dimensional image of the object to generate image data; and
   a second input device operable by the user;
   wherein said controller makes said display device display the two-dimensional image based on the image data generated by said pickup device until said second input device is operated and makes said measuring device start to measure the three-dimensional form after said second input device is operated.

3. The apparatus according to claim 1, further comprising:
   a second input device operable by the user to instruct rotation of the object displayed by said display device; and
   a data processor for converting a display direction of a form displayed by said display device according to a rotation instruction of said second input device.

4. The apparatus according to claim 1, further comprising:
   a data input device for receiving three-dimensional data from an external apparatus;
   wherein when the data is received by said data input device, said controller makes said display device display a form based on the data received from the external apparatus and makes said working device work the material based on the data.

5. A three-dimensional forming apparatus comprising:
a characteristic extraction device for receiving three-dimensional form data and extracting characteristics therefrom;
a material supplier for storing a plurality of stock materials respectively differing in shape;
a selector and transporter for selecting a stock material having an appropriate shape based on the characteristics extracted by said characteristic extraction device and transporting the selected stock material to a working area; and
a working apparatus for working the selected stock material at the work area based on the three-dimensional form data.

6. The apparatus according to claim 5, further comprising:
a data processor for processing the three-dimensional form data so that a size of the three-dimensional form the data describes corresponds to a size of the pattern to be worked.

7. The apparatus according to claim 5, further comprising:
a measuring device for measuring the three-dimensional form data of an object and supplying the three-dimensional form data of the object to said characteristic extraction device and said working apparatus.

8. A three-dimensional forming apparatus comprising:
a working apparatus for working a three-dimensional model of an object based on work data;
a storage device for storing work conditions;
a data converter for converting three-dimensional data of the object to form data according to the work conditions stored in said storage device;
a data generator for generating the work data of the three-dimensional model to be supplied to said working apparatus according to the form data converted by said data converter and the work conditions stored in said storage device; and
a three-dimensional measuring device for measuring a three-dimensional form of the object without relative rotation between the measuring device and the object to generate the three dimensional data thereof.

9. The apparatus according to claim 8, further comprising:
an image input device for receiving image data of the object and supplying three-dimensional data thereof based on the image data.

10. A three-dimensional forming apparatus comprising:
a working apparatus for working a three-dimensional model of an object based on work data;
a storage device for storing work conditions;
a data converter for converting three-dimensional data of the object to form data according to the work conditions stored in said storage device;
a data generator for generating the work data of the three-dimensional model to be supplied to said working apparatus according to the form data converted by said data converter and the work conditions stored in said storage device; and
an image and color input device for receiving image data and color data of the object and supplying three-dimensional data thereof based on the image and color data.

11. A three-dimensional forming apparatus comprising:
a three-dimensional measuring device for measuring a three-dimensional form of an object to generate three-dimensional data thereof;
a compression device for compressing the three-dimensional data in a predetermined direction by non-uniform compression; and
a working apparatus for working a three-dimensional model based on the compressed three-dimensional data obtained by said compression device.

12. The apparatus according to claim 11, wherein said working apparatus performs cutting and the predetermined direction is depth direction.

13. The apparatus according to claim 11, wherein said compression device performs compression of the data in a direction in which the object opposes said measuring device.

14. A three-dimensional forming apparatus comprising:
a measuring device for measuring a three-dimensional form of an object to generate three-dimensional data thereof;
a detector for detecting a background portion of the three-dimensional data;
a data converter for converting the three-dimensional data at the background portion detected by said detection device to be predetermined form data; and
a working apparatus for working a three-dimensional model by working a material according to the three-dimensional data converted by said data converter.

15. The apparatus according to claim 14, further comprising:
a defect detector for detecting a defect portion in the three-dimensional data;
wherein said data converter converts the three-dimensional data at the defect portion to predetermined form data.

16. A reproduction apparatus comprising:
a pick-up device for imaging a two-dimensional image of an object;
a measuring device for measuring a three-dimensional form of the object;
a working apparatus for working a material so as to reproduce the three-dimensional form measured by said measuring device;
a display device for displaying the two-dimensional form of the object imaged by said pick-up device and the three-dimensional form measured by said measuring device;
a first input device operable by a user for instructing to start a measurement by said measuring device;
a first controller for controlling said measuring device to start the measurement when instructed by said first input device while said display device displays the two-dimensional form of the object continuously and for controlling said display device to display the three-dimensional form measured by said measuring device;
a second input device operable by a user for instructing to approve or stop to start working of the three-dimensional form by said working apparatus after the measurement by said measuring device is started; and
a second controller for controlling said working apparatus to start working when approved by said second input device, and for controlling said display device to display the two-dimensional form of the object continuously instead of the three-dimensional form when instructed to stop the working by said second input device.

* * * * *